Jan. 13, 1953     A. L. VISSAT     2,625,048
MECHANICAL MOVEMENT
Filed Sept. 9, 1950
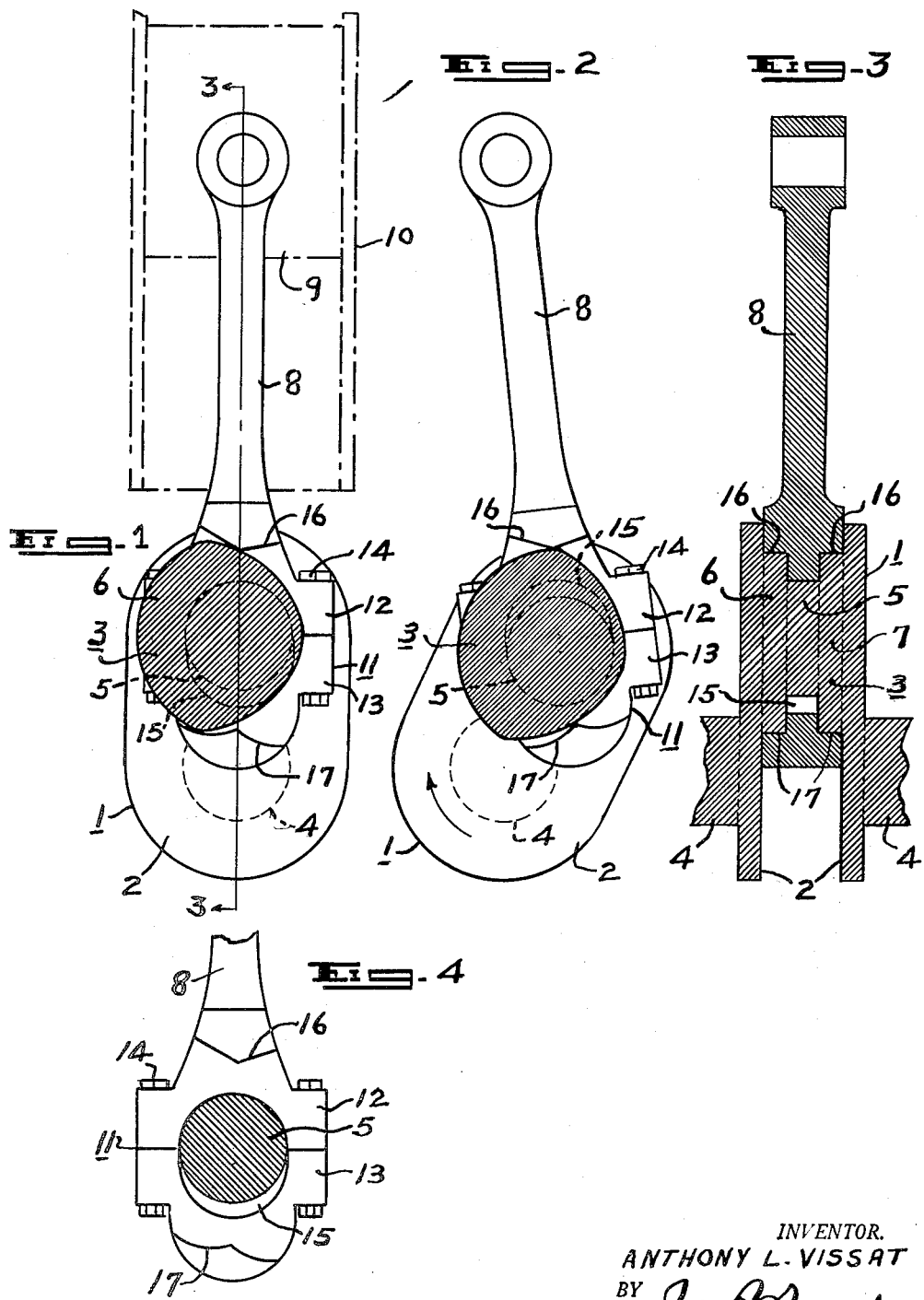
INVENTOR.
ANTHONY L. VISSAT Patented Jan. 13, 1953

2,625,048

UNITED STATES PATENT OFFICE 2,625,048

MECHANICAL MOVEMENT

Anthony L. Vissat, Pittsburgh, Pa.

Application September 9, 1950, Serial No. 183,991

1 Claim. (Cl. 74—44)

This invention relates broadly to an internal combustion engine, but more particularly to the construction of the connecting rods and of the crankshaft and to the connection of the latter with the connecting rods.

The primary object of the invention is to provide an engine construction of the character described, which embodies novel means operable for momentarily arresting the movement of the engine piston when the latter is at the maximum compressing stroke position in the engine cylinder, and further operable for allowing the connection of the associated connecting rod with the crank pin of the crankshaft to pass dead center to pre-determined degrees prior to the ignition and explosion of the fuel charge, thereby preventing any loss of compression of the fuel charge prior to the initial movement of the power stroke of the piston, and contributing maximum power and efficiency to the engine operation and performance.

Further objects and advantages of the invention are to provide a mechanism of the class stated, which is simple in its construction and arrangement, which requires no extra separate parts, which is durable, compact, positive in its action, and comparatively economical in its manufacture, operation and maintenance.

With the foregoing and other objects in view which will appear as the description proceeds, the invention resides in the novel construction, combination and arrangement of parts herein specifically described and illustrated in the accompanying drawing, but it is to be understood that the latter is merely illustrative of an embodiment of the invention, and that changes in the form, proportions and details of construction may be resorted to that come within the scope of the claim hereunto appended.

In the drawing wherein like numerals of reference designate corresponding parts throughout the several views:

Figure 1 is a side elevational view of the connecting rod and the joined crankshaft partly in section, in the upward positions when the piston is at the maximum compressing stroke position in the engine cylinder.

Figure 2 is a similar view illustrating the connection position of the connecting rod and engaged crank pin passed dead center positions prior to the initial movement of the power stroke of the piston.

Figure 3 is a sectional view taken on lines 3—3, Figure 1.

Figure 4 is a side elevational view of the two-piece bearing at the lower end of the connecting rod.

Referring in detail to the drawing 1 represents an integrally constructed crankshaft comprising a pair of crank arms 2, which are joined in spaced relation to each other by a crank pin 3, and which are respectively provided with opposed aligned journal shafts 4 in the usual manner.

The crankshaft 1 is generally of the conventional construction excepting the crank pin 3, which latter is shaped to form a cylindrical center member 5 and a pair of cam members, respectively indicated at 6 and 7. The cam members are disposed at respective ends of the crank pin between the center member and respective crank arms 2, as clearly shown in Figure 3.

The cam members 6 and 7 are similar and disposed parallel to each other and eccentrically with respect to the axial center of the crank pin 3. The relative position of the cam members with respect to the crank arms 2 is such as to dispose the enlarged portions of the cam members in the rearward direction when the crankshaft 1 is in the upward position, as illustrated in Figure 1. The term "rearward" is herein applied relatively to the direction of rotation of the crankshaft, as indicated by an arrow in Figure 2.

A connecting rod 8, adapted to having its upper end connected with the piston 9 in the engine cylinder 10 in the usual manner, is provided with a bearing 11 at its lower end. The bearing comprises an upper section 12 formed integrally with the connecting rod, and a removable lower section 13. The bearing sections 12 and 13 are secured together by bolts 14.

The bearing 11 is provided with an oblong bearing opening 15, which extends longitudinally with respect to the longitudinal disposition of the connecting rod 8. The bearing 11 has a pivotal floating engagement and connection on the cylindrical center member 5 of the crank pin 3, as shown in Figure 4.

A pair of laterally disposed cam shoulders 16 are formed at respective sides of the upper end portion of the upper bearing section 12, and a pair of similarly disposed cam shoulders 17 are formed at respective sides of the lower end portion of the lower bearing section 13.

The irregular peripheral surfaces of the cam members 6 and 7 are in sliding contacting engagement with the irregular contacting surfaces of respective cam shoulders 16 and 17. The contour of the irregular contacting surfaces of the cam members and of the cam shoulders is such that, the cam members will be in contacting engagement at two opposed points with some points of respective cam shoulders at all times during the operation of the mechanism in the manner to be described.

In practice, the operation of the engine mechanism is as follows: When the crankshaft 1 and the connecting rod 8 are on dead center with the piston 9 in the upward position in the cylinder 10, the center member 5, of the crank pin 3, is in contacting engagement with the upper end wall of the oblong opening 15 in the connecting rod bearing 11, and the larger portions of the cam members 6 and 7 are disposed rearwardly of the cam shoulders 16, as shown in Figures 1, 3, and 4.

The engagement of the cam shoulders 16 with the cam members 6 and 7 will momentarily stop or even slightly elevate the connecting rod 8 and attached piston 9 in the cylinder 10, while the crank arms 2 move forwardly to an angle of predetermined degrees from dead center. Such forward crank arm movement, which for greatest efficiency is preferably somewhere between seventeen and twenty-five degrees, will not activate or shift the connecting rod and piston from their held upward positions until the center member 5 of the crank pin 3 has shifted from the upper end wall of the oblong bearing opening 15 to the lower end wall of the latter, as shown in Figure 2.

It will here be noted that, at the time the explosion takes place in the cylinder to effect the power stroke, the piston 9 will be at the maximum upward compression stroke position in the cylinder, and in consequence full compression of the fuel charge is maintained until exploded. Further, the explosion is correctly timed to take place when the crank arms have passed dead center to the angle of predetermined degrees, whereby the crank shaft will be rotated with a minimum of resistance by the driving force of the cam shoulders 16 against the respective cam members 6 and 7 during the power stroke of the piston. It is, of course, apparent that at the beginning of the suction stroke also, the piston, connecting rod, and crankshaft will be in the positions above described, but the suction stroke will function in the usual manner.

The present invention provides an efficient device of its kind, which may be economically constructed, and successfully employed for the purposes and in the manner herein set forth.

What I claim is:

In driving means for an internal combustion engine, a cylinder, a piston mounted for reciprocal movement in said cylinder, a crankshaft including a crank pin, a pair of similar parallel disposed cam members formed integral with the crankshaft and being disposed at respective ends of the crank pin, a connecting rod having the upper end thereof pivotally connected with said piston, an upper bearing section formed integral with the lower end of said rod, a lower bearing section, bolts for securing said lower bearing section to said upper bearing section, said bearing sections having a pivotal floating connection with said crank pin between said cam members, a pair of laterally disposed shoulders formed integral at respective sides of said upper bearing section, a pair of laterally disposed shoulders formed integral at respective sides of said lower bearing section, said shoulders having sliding contacting engagement on the peripheral surfaces of respective cam members and being operable for preventing the downward stroke movement of said piston in said cylinder until said crankshaft has shifted a predetermined degree passed dead center.

ANTHONY L. VISSAT.

REFERENCES CITED

The following references are of record in the file of this patent:

UNITED STATES PATENTS

| Number | Name | Date |
|---|---|---|
| 1,995,554 | Ulinski | Mar. 26, 1935 |
| 2,165,791 | Farrell | July 11, 1939 |
| 2,353,285 | Bell | July 11, 1944 |
| 2,408,546 | Bell | Oct. 1, 1946 |